(12) United States Patent
Bailey

(10) Patent No.: US 8,038,319 B2
(45) Date of Patent: Oct. 18, 2011

(54) LUMINAIRE AND METHOD OF OPERATION

(75) Inventor: Edward Bailey, Westampton, NJ (US)

(73) Assignee: Lighting Science Group Corporation, Westampton, NJ (US)

( * ) Notice: Subject to any disclaimer, the term of this patent is extended or adjusted under 35 U.S.C. 154(b) by 254 days.

(21) Appl. No.: 12/472,452

(22) Filed: May 27, 2009

(65) Prior Publication Data
US 2009/0296407 A1    Dec. 3, 2009

Related U.S. Application Data

(60) Provisional application No. 61/056,762, filed on May 28, 2008.

(51) Int. Cl.
*F21V 5/00*    (2006.01)
(52) U.S. Cl. .............. 362/245; 362/249.02; 362/311.02; 362/327; 362/332; 362/336
(58) Field of Classification Search .......... 362/240–248, 362/249.02, 311.02, 327, 332–340, 800
See application file for complete search history.

(56) References Cited

U.S. PATENT DOCUMENTS

| | | |
|---|---|---|
| 1,601,688 A | 9/1926 | Nystrom |
| 4,991,073 A | 2/1991 | Levin |
| 6,721,102 B2 | 4/2004 | Bourdelais |
| 6,831,786 B2 | 12/2004 | Bourdelais et al. |
| 6,846,098 B2 | 1/2005 | Bourdelais |
| 6,867,927 B2 | 3/2005 | Bourdelais et al. |
| 6,890,642 B2 | 5/2005 | Kaminsky et al. |
| 6,898,012 B2 | 5/2005 | Kaminsky |
| 6,900,941 B2 | 5/2005 | Kaminsky et al. |
| 6,958,860 B2 | 10/2005 | Dontula et al. |
| 7,319,293 B2 | 1/2008 | Maxik |
| 7,367,692 B2 | 5/2008 | Maxik |
| 2007/0018175 A1 | 1/2007 | Mazzochette et al. |

FOREIGN PATENT DOCUMENTS

| | | |
|---|---|---|
| DE | 202005004080 U1 | 7/2005 |
| EP | 1630876 A2 | 3/2006 |
| WO | 2008/080165 A2 | 7/2008 |
| WO | 2008/089324 A2 | 7/2008 |

OTHER PUBLICATIONS

European Search Report for EP Application No. 09161287; Filing Date: May 27, 2009; 5 pgs.

*Primary Examiner* — Jason Moon Han
(74) *Attorney, Agent, or Firm* — Cantor Colburn LLP

(57) ABSTRACT

A luminaire and a method of operating a luminaire is provided. The luminaire includes a light source emitting a plurality of light rays. A collimation device is arranged to receive a portion of light from the light source and transmits the portion of light through an exit aperture towards an illuminated area. The exit aperture includes a planar portion and at least one lenslet formed thereon. The lenslet is arranged having a first profile and a second profile, where the portion of light is refracted on a plurality of angles to form a twisted profile by the lenslet.

19 Claims, 15 Drawing Sheets

FIG. 5

| | - angle (deg) | + angle (deg) |
|---|---|---|
| angular perturbation | -90 | 90 |
| | | |
| x | y | alpha (deg) |
| -9.216 | -10.240 | 6 |
| -5.120 | -10.240 | -13 |
| -1.024 | -10.240 | 66 |
| 3.072 | -10.240 | 74 |
| 7.168 | -10.240 | -47 |
| -9.216 | -8.192 | -39 |
| -7.168 | -9.216 | -25 |
| -5.120 | -8.192 | -56 |
| -3.072 | -9.216 | 50 |
| -1.024 | -8.192 | 17 |
| 1.024 | -9.216 | -6 |
| 3.072 | -8.192 | -20 |
| 5.120 | -9.216 | 18 |
| 7.168 | -8.192 | 20 |
| 9.216 | -9.216 | -13 |
| -9.216 | -6.144 | -50 |
| -7.168 | -7.168 | 64 |
| -5.120 | -6.144 | 58 |

LUMINAIRE AND METHOD OF OPERATION

CROSS REFERENCE TO RELATED APPLICATIONS

This application claims priority to U.S. Provisional Application Ser. No. 61/056,762 entitled "Light Dispersion Device for MR-16 Replacement" filed on May 28, 2008 which is incorporated herein by reference in its entirety.

BACKGROUND OF THE INVENTION

The subject matter disclosed herein relates to optical luminaires for generating light and in particular to a luminaire that eliminates die imaging caustics such as undesirable non-uniform concentrations of light, and improves spatial uniformity by using means for twisting a profile of a bundle of light rays.

Lighting devices, such as incandescent or halogen sources for example, are used in many retail and product display venues due to the high light directionality and high color rendering index ("CRI") they can achieve. These lighting devices use a standard receptacle, such as MR-16 for example, to receive a light source. The designation MR-16 stands for "Multifaceted Reflector" where the "16" represents the number of eighths of an inch for the outer diameter of the lighting device, in the case of MR-16 the diameter is 2 inches.

A CRI for a lighting device is an average of the color shift exhibited by the light reflecting from a color reference grid, typically comprised of 8 or 14 tiles. This reflected light is compared to the same grid reflecting an ideal illuminant. The ideal illuminant is a plankian radiator for color temperatures less than 5,000° K and a daylight source spectrum for sources having color temperatures of 5,000° K and greater. It is desirable to have a CRI of at least 90 for lighting applications such as a retail display for clothing and food or for applications requiring attentive examination of detailed features, such as illumination in a surgical operating room.

The MR-16 lamp is a light source typically used for highlighting, product display and where attentive examination of detailed features is desired. Exemplary power levels of an MR-16 lamp are 20, 35, 50 or 72 watts. A typical 20 W halogen MR-16 lamp producing 300 lumens has a disadvantage of a short life span and poor luminous efficacy. The typical lifetime of a halogen MR-16 lamp is 2,000 hours, while the typical luminous efficacy is 15-23 lumens/watt.

While existing luminaires are suitable for their intended purposes, improvements may be made in providing a replaceable luminaire having similar CRI output light characteristics and light distribution patterns to existing lighting devices while increasing luminous efficiency and life-span.

BRIEF DESCRIPTION OF THE INVENTION

According to one aspect of the invention, a luminaire is provided including a light source emitting a plurality of light rays. A collimation device is arranged to receive a portion of light from the light source and transmitting the portion of light through an exit aperture, the exit aperture having at least one lenslet formed thereon. The at least one lenslet has a first profile with an associated a non-linear center line and a series of second profiles each orthogonal to the non-linear line, wherein the portion of light is refracted on a plurality of angles by the at least one lenslet.

According to another aspect of the invention, a luminaire is provided having a light emitting diode (LED). A collimator device is arranged to receive light from the LED, the collimator device having an exit aperture opposite the LED. A lenslet array is operably coupled to the exit aperture, the lenslet array having a plurality of substantially tear-drop shaped wisp lenslets thereon. The plurality of wisp lenslets is arranged in a noncontiguous pattern, wherein each of the plurality of wisp lenslets are shaped to diffract a group of parallel light rays received from the exit aperture are formed into a twisted profile.

According to yet another aspect of the invention, a method of lighting an area is provided. The method includes the generating of a plurality of rays of light. A first portion of said plurality of rays of light is collimated, wherein the first portion includes a second portion and a third portion. The first portion of rays of light is directed into a lenslet array having a first lenslet. The second portion of rays of light is refracted with a first lenslet, wherein the refracted second portion of rays of light forms a twisted profile.

These and other advantages and features will become more apparent from the following description taken in conjunction with the drawings.

BRIEF DESCRIPTION OF THE DRAWING

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

FIG. 5 is a tabular illustration of exemplary positions and orientations of the lenslets of FIG. 4;

Figure 1:
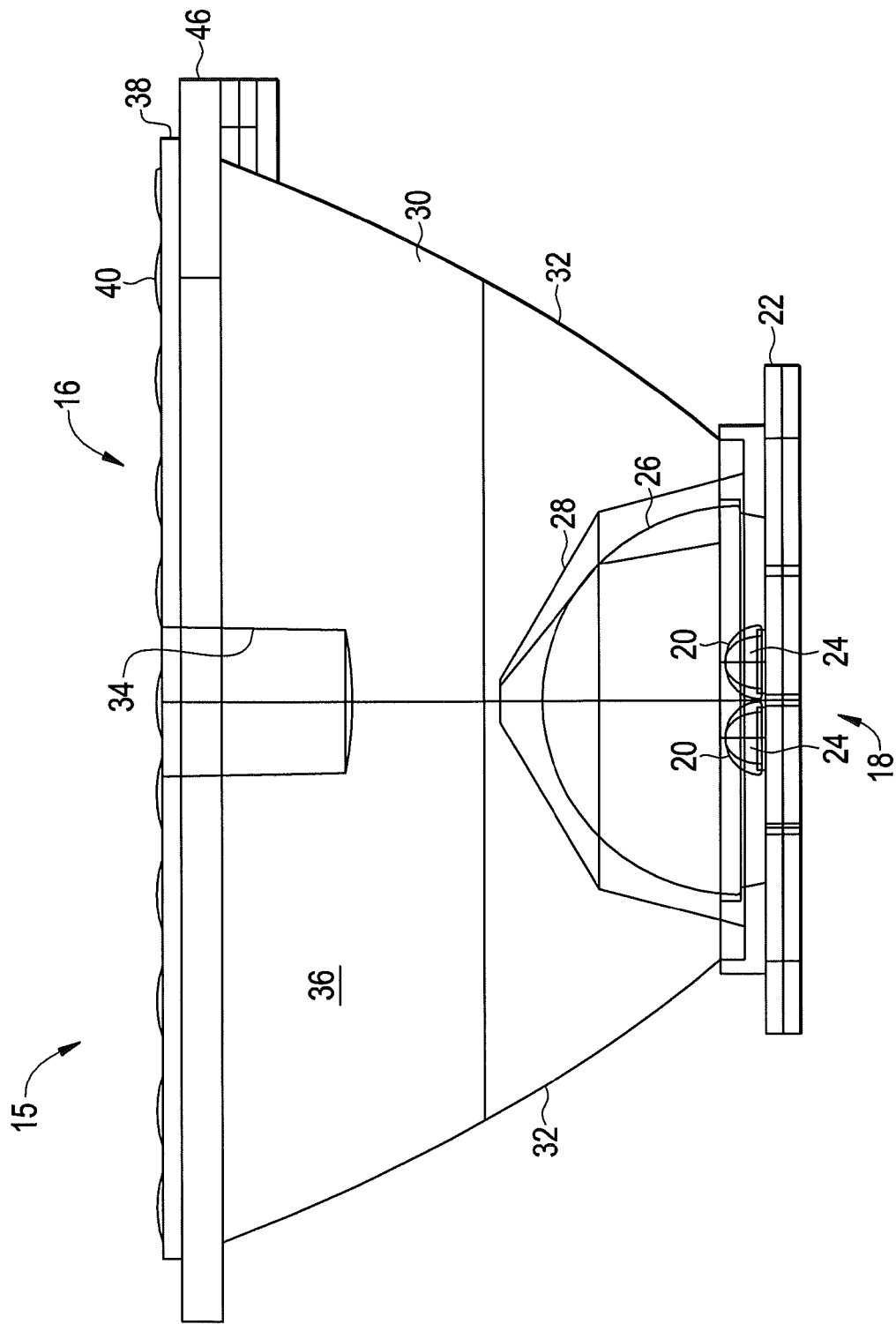
FIG. 1 is a side plan view illustration of a luminaire in accordance with an embodiment of the invention.

The detailed description explains embodiments of the invention, together with advantages and features, by way of example with reference to the drawings.

DETAILED DESCRIPTION OF THE INVENTION

Embodiments of the present invention provide a luminaire that collimates light from an LED light source and disperses the light using a lenslet feature geometry called a "wisp lenslet". A plurality of wisp lenslets is distributed throughout the cross-section of a collimated light beam. Each wisp lenslet slightly disperses and twists a bundle of light rays through refraction. The shape of the lenslet is arranged to refract individual rays of light to form a light ray bundle having a twisted profile upon exiting the luminaire. This refractive dispersion induced by the wisp lenslets provides advantages in the: (1) lessening the imaging of the light emitters; (2) lessening caustics in the collimated light beam caused by surface imperfections in the reflective or refractive optics; and (3) lessening the spatial light inconsistencies in the collimated light-beam, i.e., improving the color and/or intensity uniformity of the emitted light.

The twist profile is produced by the refraction of light passing through a surface of the wisp lenslet. The angle of refraction of a particular ray depends on the angle of incidence of that ray and the difference in the index of refraction between the material of the wisp lenslet and that of the volume outside the wisp lenslet. As will be discussed in more detail herein, each ray may experience a different angle of incidence due to the curved surface design of the wisp lenslet, and this effect upon individual rays within a bundle may induce a twisting profile effect to the entire or a portion of the light ray bundle. The bundle of light rays exhibit no further twisting by the wisp lenslet once the bundle of rays has exited the wisp lenslet, therefore the twisting effect is like a single coil rather than a continuous coil.

An LED light source cavity includes the LED semiconductor chip, the encapsulant and phosphor, as well as required electrical connections. Light that exits the LED cavity typically is highly dispersive and has a Lambertian intensity distribution, due to the spontaneous emission process in the LED device chip that produces the light. An LED emits light with many electromagnetic modes of propagation. In contrast, a diode laser has a more complex and advanced structure than an LED, producing light that is both spatially and spectrally coherent. The simpler LED structure allows low device cost for general lighting applications.

A total internal reflection ("TIR") collimation optic is a device used to collimate light emitted from an LED cavity. A TIR collimation optic includes a sidewall structure in which light enters one end and exits at the other end, propagating along a major axis of the sidewall. A portion of the light may be designed to pass through the sidewall, depending upon the desired effect. The cross-sectional sidewall shape of TIR collimation optic in the direction of the major axis can be described by a collimation polynomial, and the shape is selected to impart a desired effect upon the light. The sidewall functions as a mirror at the dielectric to air interface, with the collimation polynomial shape selected to direct at least a portion of the rays of light from an outward direction to a forward direction. The collimation polynomial shape is also known as the light guidance curve.

The TIR collimation optic directs light to propagate through the material to a final exit aperture. The exit aperture of the TIR collimation optic is transparent, providing an exit face. The TIR collimation optic may be made from a bulk material that is transparent at visible wavelengths, for instance, cyclic olefin copolymer ("COC"), polycarbonate, or an acrylic glass like poly(methyl methacrylate) (PMMA). The TIR collimation optic operates to reflect the rays through the total internal reflection condition in which rays immersed in a bulk dielectric with direction cosines less than a defined angle may reflect at the air-TIR collimation optic interface rather than transmit through the interface. Light rays having less than the defined angle may be referred to herein as having a "TIR mirror" condition.

As light traverses the TIR collimation optic, the structure will have areas of higher or lower luminance or brightness, due to the limitations in the production of the collimation structure. It is desirable to disperse the light beam slightly in a random manner, without introducing additional artifacts in the light beam, in order to fill the gaps in the light beam as it emanates from the face of the collimation optic. In the exemplary embodiment, the luminaire includes an array of refraction lenslets. The array of refraction lenslets is positioned at the exit aperture of the TIR collimation optic in order to change the emitted light distribution pattern.

Embodiments of the luminaire include a lenslet or light control feature referred to as a "wisp lenslet". The configuration of the wisp lenslet includes two polynomials: one in the longitudinal direction that follows a cross-section of the wisp contour; and a second in the transverse direction which both serve to perturb the light exiting the light collimation device. Each polynomial in either the longitudinal or transverse direction disperses the light differently. The combined effect of the contour of the wisp lenslet serves to twist the light as illustrated in the figures described below.

In addition, each wisp lenslet arrayed over the face of the luminaire will have a perturbation with respect to the orientation of the contour. That is, each wisp lenslet could have a different rotational angle of orientation with respect to the axis normal to the face of the optic. As light bundles pass through each of the wisp lenslets, they are perturbed in a defined manner thereby providing advantages in improving the spatial uniformity.

The density of the placement of the wisp lenslets may determine the degree of dispersion required to achieve the uniformity desired. A higher density of wisp lenslets will disperse the light more than a sparse density. Sparse density of the lenslets allows the light to remain more collimated thereby providing advantages in boosting the on-axis intensity of the light beam.

The wisp lenslets may be placed in locations that serve to provide the desired control of the light. As used herein, the phrase "controlling the light" refers to production of TIR and refractive structures which produce collimation at high uniformity a quality desirable for general illumination It is desirable to provide a degree of rotational orientation to each of the wisp lenslets comprising the lenslet array to improve uniformity in the exiting light field.

Further, as used herein, the term "sag" refers to the thickness of the wisp lenslet at the peak, as determined by the transverse polynomial. Each wisp lenslet may have a different amount of peak sag. Thicker sag may produce a more aggressive caustic thereby dispersing the light greater than a lenslet with thinner peak sag. However, a thin wisp lenslet with a thin sag may be more efficient and reduces the probability of light back-reflecting due to a TIR mirror condition and propagating back to the source, which is undesirable.

The light bundle behavior at the wisp lenslet/air boundary may experience energy splitting caused by a fresnel condition, wherein the fresnel reflection or condition refers to the equations derived by Augustin Fresnel describing the behavior of light when moving between media of different refractive indices such as optical polycarbonate and air. The fresnel reflections refer to a splitting of the light energy at the dielectic/air interface in which a percentage of the light will back-reflect towards the source depending on the angle of incidence of the light with respect to the dielectric/air interface geometry. The shape of the wisp lenslet perturbs each section of the light bundle in a different manner. When observing the ray bundle before and after traversal of the wisp lenslet array it can be seen that the twist profile of the light is in a state in which one wisp lenslet induced light twist behavior is different from that of the light exiting the adjacent wisp lenslet. A primary composite effect of the wisp lenslet array is an enhancement of the spatial uniformity of the light beam produced. A secondary composite effect from the wisp lenslet array is a cancellation of some of the tolerance errors in the LED placement, and their effect on the light emanating from the light collimation device.

Figure 2:
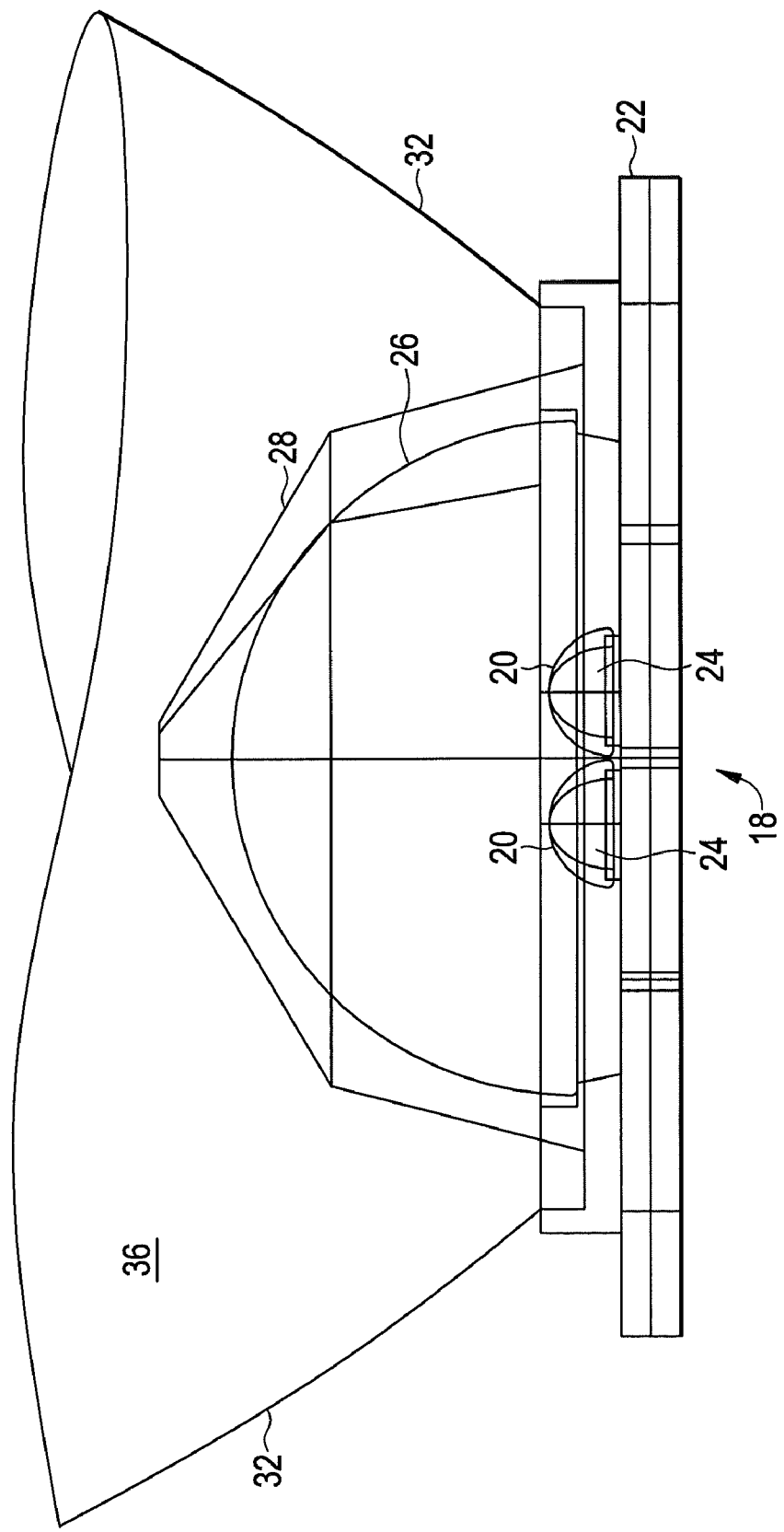
FIG. 2 is an enlarged partial side plan view illustration of the luminaire of FIG. 1.

FIG. 1 and FIG. 2 illustrate a luminaire 15 having a TIR collimation optic 16 and the LED light emission device 18. The LED light emission device 18 includes an LED emitter array 20 mounted on printed wiring board ("PWB") 22. The LED emitter array 20 and PWB 22 cooperate to produce emitted light. A phosphor conversion cavity 24 converts the emitted light to a phosphor-emitted light having a more desirable CRI, for instance by changing the wavelength of the emitted light from blue to yellow and a composite, producing a white color.

The phosphor-emitted light next passes through a light extraction lens 26, which is typically made from COC or glass. The light extraction lens 26 increases the usable proportion of the phosphor-emitted light. The light extracted by light extraction lens 26 passes through the interior polynomial surface 28 of the light collimation device 30. The interior polynomial surface 28 may be designed through trial and error, or iterative application of the edge-ray method, using commercially available ray-trace software. Such ray-trace software is well known to persons skilled in the art. Light passing through the interior polynomial surface 28 with a low elevation angle will reflect from the inner surface of a outer TIR mirror 32. In the exemplary embodiment, the space 36 between the interior polynomial surface 28 and the outer TIR mirror 32 is filled with the solid optical polymer. The outer TIR mirror 32 functions to produce collimated light. A void 34 is provided in the light collimation device 30 to reduce the sink (i.e., undesirable depressions) often experienced when violating uniform thickness rules for optical molding.

The collimated light passes through a lens 38 with wisp lenslet array 40 on the exit face of the TIR collimation optic 16. A flange 42 near the exit aperture of TIR mirror 32 may be used to align the TIR collimation optic 16 to a holder or bezel (not shown).

Figure 3:
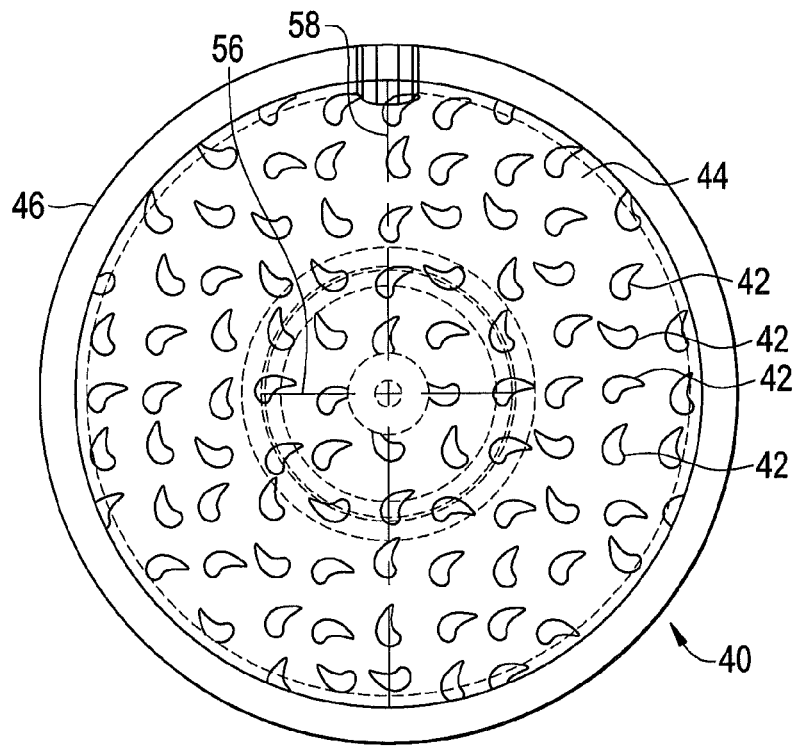
FIG. 3 is a top plan view illustration of the luminaire of FIG. 1.

A top view of an exemplary exit face of the TIR collimation optic 16 is illustrated in FIG. 3. The wisp lenslet array 40 includes a plurality of wisp lenslets 42 forming an exemplary array of wisp lenslets formed on the surface 44. For sake of clarity, not all wisp lenslets have been marked with a reference number. It should be understood that the quantity, placement and orientation of individual wisp lenslets might vary in other embodiments from the embodiment shown in FIG. 3. In the exemplary embodiment, the surface 44 is substantially flat, however, other shapes, such as a curved surface are contemplated. It should be appreciated that in the exemplary embodiment, the wisp lenslet array 40 is formed in the lens 38. However, in other embodiments, the wisp lenslet array 40, the lens 38 and the solid portion 36 of the light collimation device 30 are formed as a single integrated component.

A flange area 46 is provided to assist in mounting and securing the assembly, however, it should be understood that equivalent features not depicted could be used for mounting and securing the assembly, for instance mounting pads, longitudinal ribs with bumps, etc. In the exemplary embodiment the TIR collimation optic 16 is sized and shaped to replace a MR-16 lamp with a diameter of the assembly of 22.5 mm.

Figure 4:
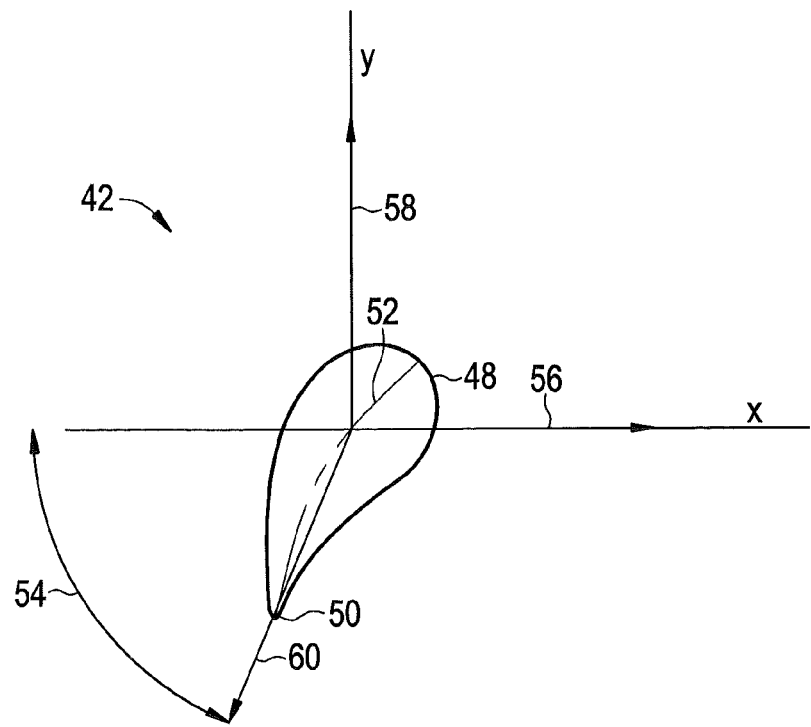
FIG. 4 is a top plan view illustration of a lenslet of FIG. 3.

An exemplary lenslet 42 is illustrated in FIG. 4. In this embodiment, the lenslet 42 includes a first semicircular end 48 and a second substantially pointed opposite end 50. A centerline 52 extends between the first end 48 and the second end 50. By convention, the angle 54 of vector 60 sometimes referred to as the alpha angle is the orientation angle of the lenslet with respect to the X-axis 56 (FIG. 3), but it could equivalently be defined with reference to the Y-axis 58 (FIG. 3). The origin for vector 60 is the centroid of the lenslet 42. In the exemplary embodiment, the lenslets 42 of wisp lenslet array 40 may be arranged on a plurality of different angles 54. A table showing exemplary coordinates and angles 54 for lenslets 42 is shown in FIG. 5.

Figure 6:
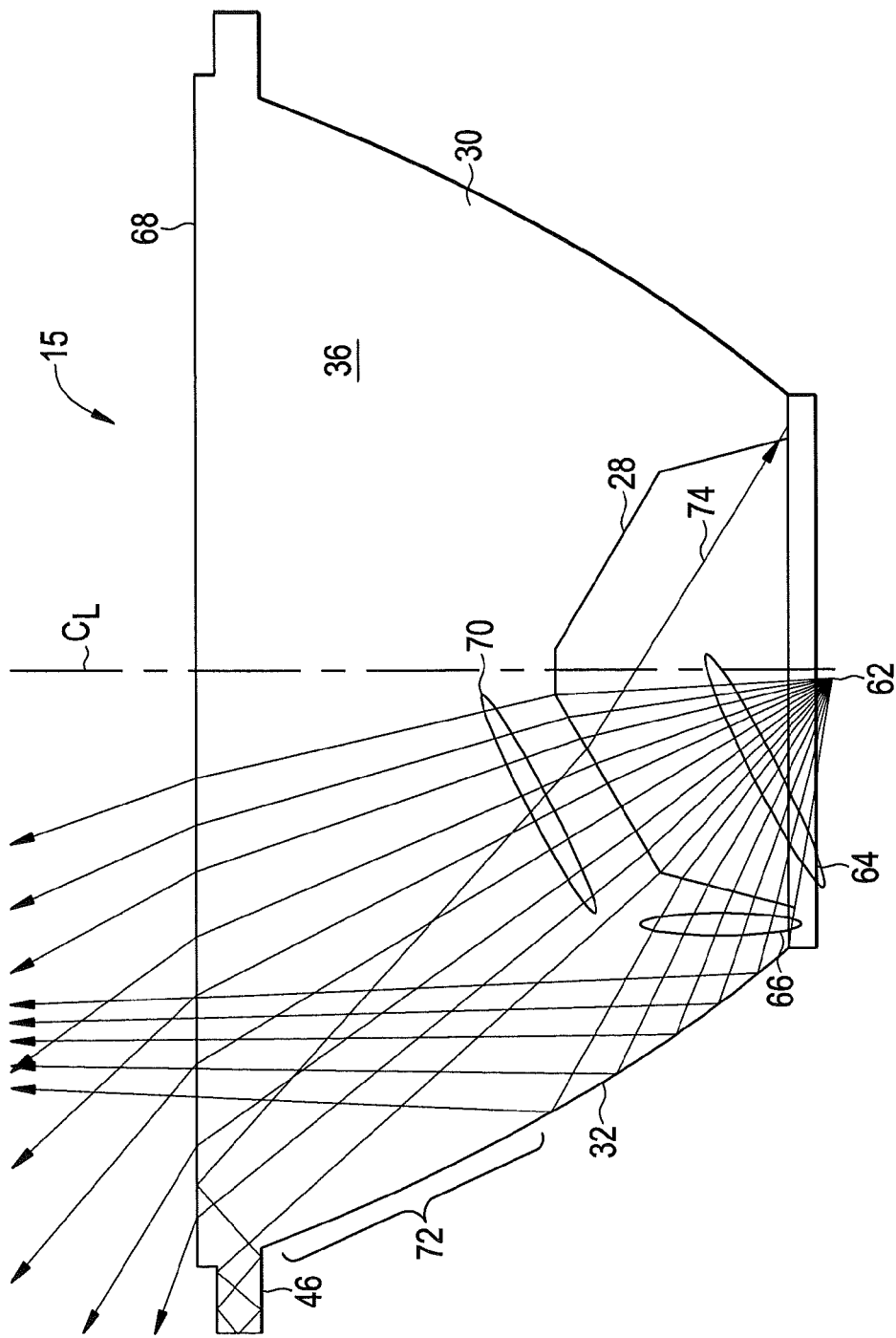
FIG. 6 is a side plan view illustration of the luminaire of FIG. 1 illustrating light ray bundles emanating from a light source.

During operation, we can approximate the light energy divergence through the use of light rays as generated by the LED emitter array 20. FIG. 6 illustrates exemplary light ray paths (i.e., a light fan) as light passes through the light collimation device 30, without the wisp lenslet array 40 at the exit aperture 29 of the light collimation device 30. The light rays depicted are first order representations of the light fields exiting the LED cavity. Light is illustrated emanating from a single LED at point 62, depicted forming a light fan 64, but it should be understood that the LED emitter array 20 is typically made from a plurality of individual light emitting diodes. Therefore, the total light fan will be the superposition of many light fans 64 emanating from the LED emitter array 20 and overlying phosphor.

Light passes through the interior polynomial surface 28 of the light collimation device 30. It will be understood that the interior polynomial surface 28 may be designed with strong weighting factors or may also be designed to include one or more straight-line sections. Light rays 66 that emanate from the interior polynomial surface 28 at a low elevation angle are collimated by the outer TIR mirror 32 and then pass through the exit aperture 68 of the TIR collimation optic 16. Light rays 70 that emanate from the interior polynomial surface 28 at a high elevation angle pass directly to the exit aperture 68 without being collimated by the TIR mirror 32.

Light rays that pass through interior polynomial surface 28 refract at an angle dependent upon the angle incident upon the interior polynomial surface 28. The piecewise-linear shape of the interior polynomial surface 28 may cause a void in the density of light passing through interior polynomial surface 28, resulting an area 72 on the surface of TIR mirror 32 that has a lower intensity of incident light. Voids or light intensity sinks are undesirable in the light field and should be minimized while keeping efficiency as high as possible. A small proportion of light, illustrated by light ray 74 for example, may reflect from flange area 46 back toward the light source. A collimated bundle of light rays will produce a stronger intensity of light in the center of the illumination field (not shown). Collimated light rays are also sensitive to manufacturing errors thus requiring some diffusion to mask voids, tooling tolerances, and source positioning or manufacturing errors contained in the light source itself.

Figure 7:
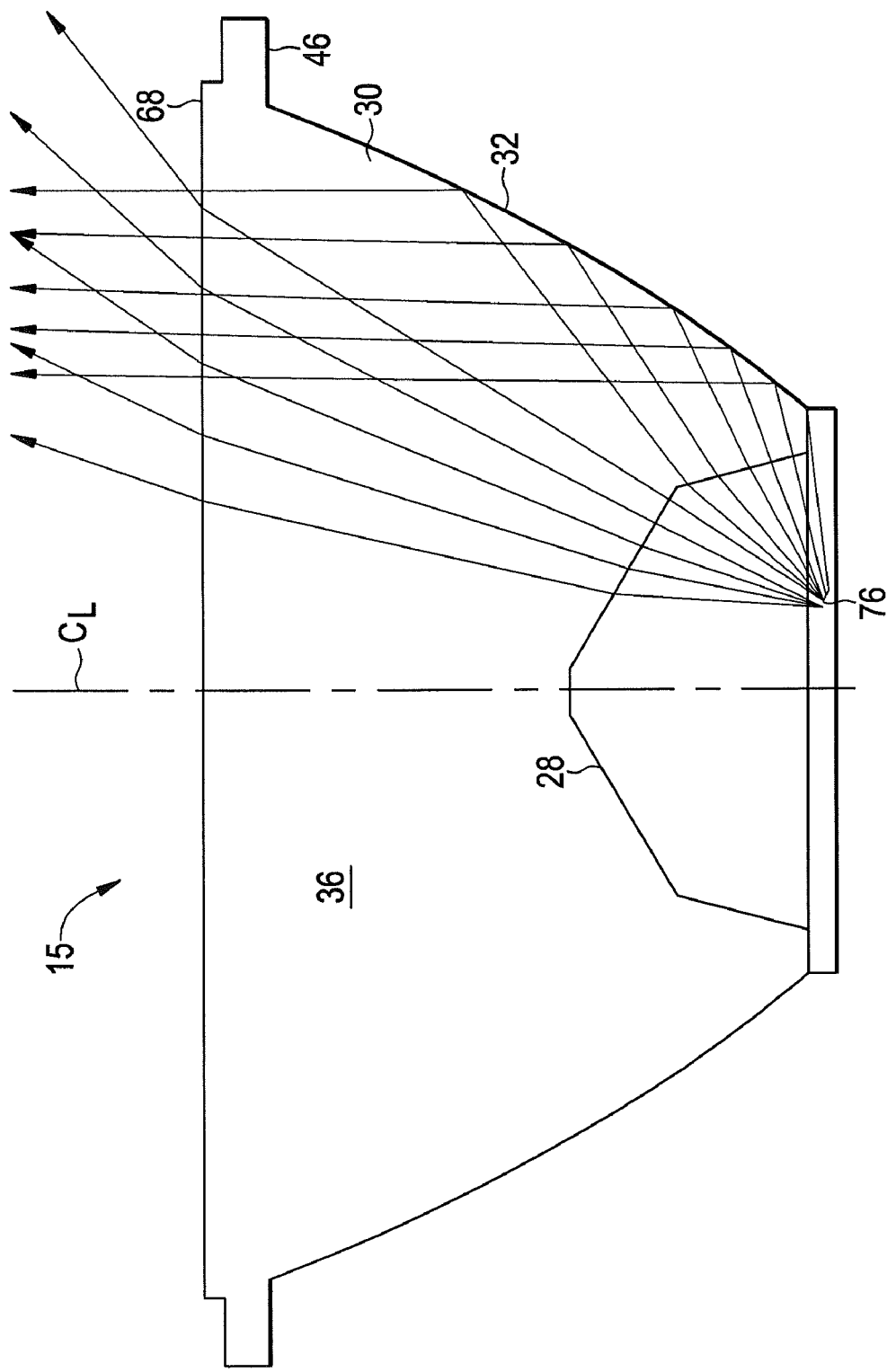
FIG. 7 is another side plan view illustration of the luminaire of FIG. 6 illustrating light ray bundles emanating from a light source.

FIG. 7 illustrates exemplary light rays emanating from a point 76 and passing through the right side of the light collimation device 30. It should be appreciated that FIG. 7 illustrates the light rays, without any light rays tunneling through the flange 46 as is shown in FIG. 6, which illustrates the tunneling of the light into the holder and alignment flange 46.

Figure 8:
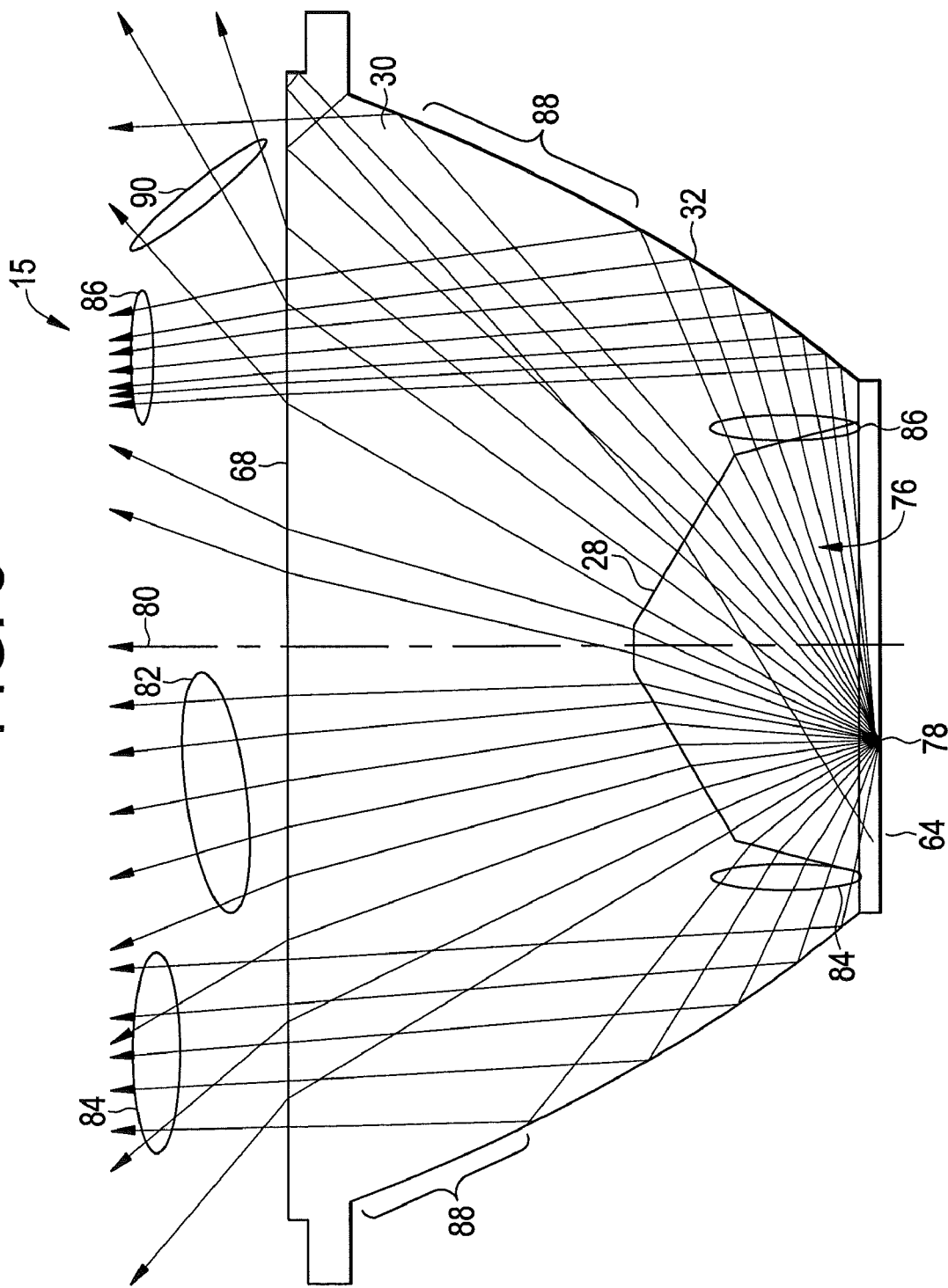
FIG. 8 is yet another side plan view illustration of the luminaire of FIG. 7 illustrating light ray bundles emanating from a light source.

FIG. 8 illustrates an exemplary light ray fan 76 emanating from an LED 78 located at a position that is off-axis from the center 80 of the light collimation device 30. The shape and position of the ray fan 41 is illustrated in FIG. 8 with intensity bounds, as ray fan 76 passes through the interior polynomial surface 28 and through the interior of the TIR mirror 32. Intensity is measured in direction cosine degrees with respect to an orthonormal vector originating from the center of the light cavity. Intensity in photometric units is measured in candela, or lumens per steradian.

Certain light rays, such as light ray bundle 82, are emitted from the LED 78 at a high elevation angle such that light ray bundle 82 does not reflect from the TIR mirror 32. Consequently, light ray bundle 82 is emitted from the light collimation device 30 as a dispersive bundle of light rays. In contrast, light ray bundles 84, 86 are emitted from the LED 78 at a low elevation angle such that light ray bundles 84, 86 reflect from the TIR mirror 32. Consequently, light ray bundles 84, 86 are emitted from the light collimation device 30 as collimated bundles of light rays. One or more light voids 88 may be introduced into the light distribution pattern by refraction of the light passing through interior polynomial surface 28. A refraction zone at the outer edge of exit aperture 68 causes a portion 90 of the light rays to be refracted outside of the usable illumination area of the light collimation device 30.

Figure 9:
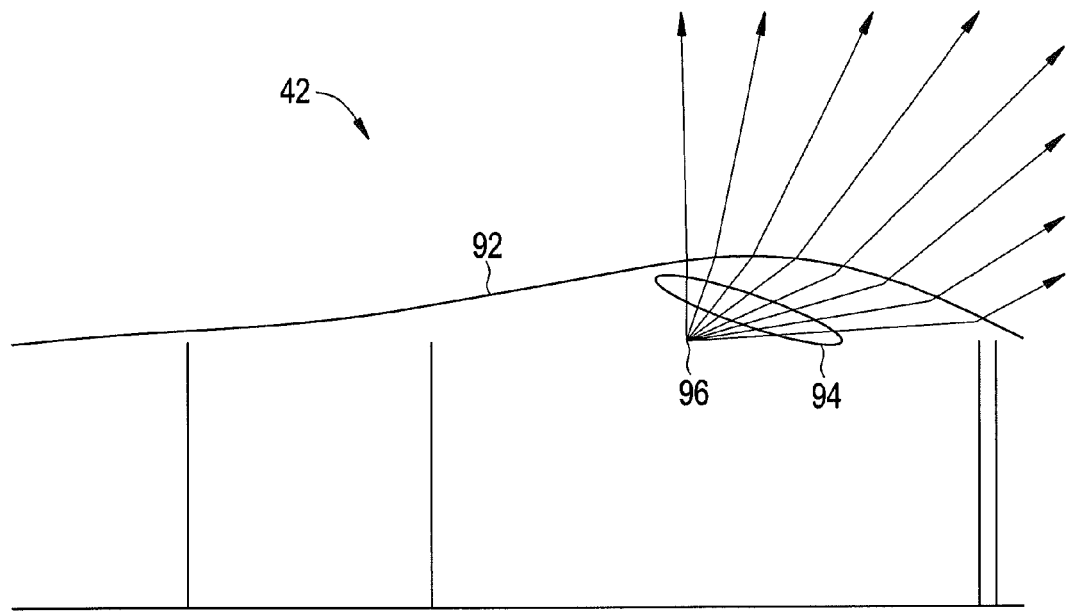
FIG. 9 is a schematic side view illustration of height along a long dimension for the lenslet of FIG. 4, illustrating a longitudinal polynomial.

Referring now to FIG. 9, a cross-sectional profile view of a wisp lenslet 42 along the long or centerline dimension 52 is illustrated. Surface 92 represents the longitudinal polynomial of the wisp lenslet 42. Exemplary light fan 94 is shown emanating from a point 96 within the wisp lenslet 42, it should be appreciated that the light originates from an LED emitter like that of LED emitter 20 in FIG. 1. The light rays propagate within the wisp lenslet 42 until the light rays reach the air interface at surface 92. The difference in the index of refraction between the air and the material making up wisp lenslet 42 causes the light rays to refract. Because the thickness of wisp lenslet 42 varies along its length, the amount of refraction of light from the LED emitter 20 changes along the length of wisp lenslet 42.

Figure 10:
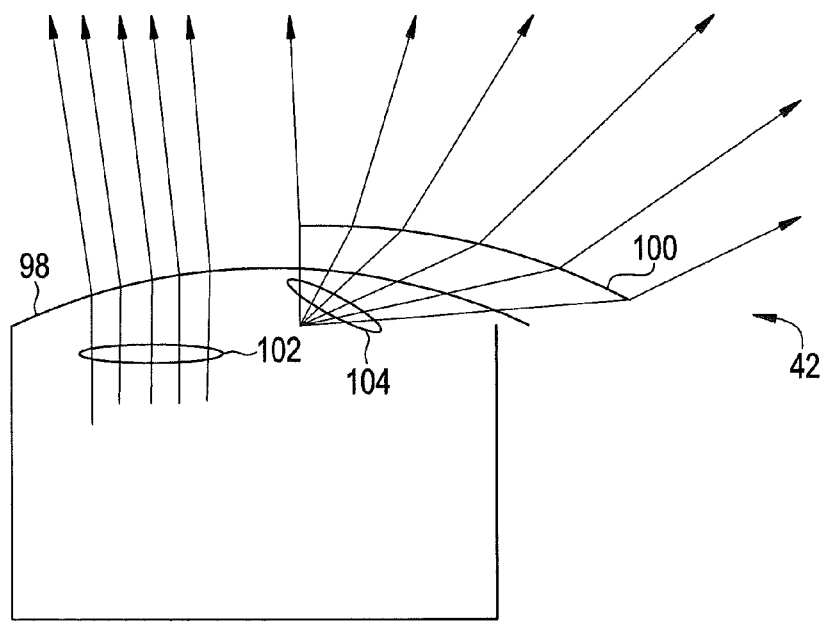
FIG. 10 is a schematic side view illustration of height along a short dimension for the lenslet of FIG. 4, illustrating the transverse polynomial.

FIG. 10 illustrates a cross-section of a wisp lenslet 42 along the transverse or short dimension of the wisp lenslet 42. In the exemplary embodiment the cross section of the short dimension is generally in a plane perpendicular to the centerline 52. The cross-section of FIG. 10 illustrates the change in height described by a transverse polynomial curve designed using one of any commercially-available CAD software package that are well known to persons skilled in the art. Surfaces 98 and 100 are top surfaces (e.g. opposite the LED emitter array 20) having a shape described by a transverse refraction polynomial. Surfaces 98 and 100 represent contours that may be at different depths into or out of the plane of FIG. 10. Light bundle 102 illustrates a slight amount of dispersion, imparted by surface 98, upon an incident bundle of light rays that are substantially parallel. Light bundle 104 illustrates the refraction induced by surface 100 upon an incident bundle of rays that are not substantially parallel.

Figure 11:
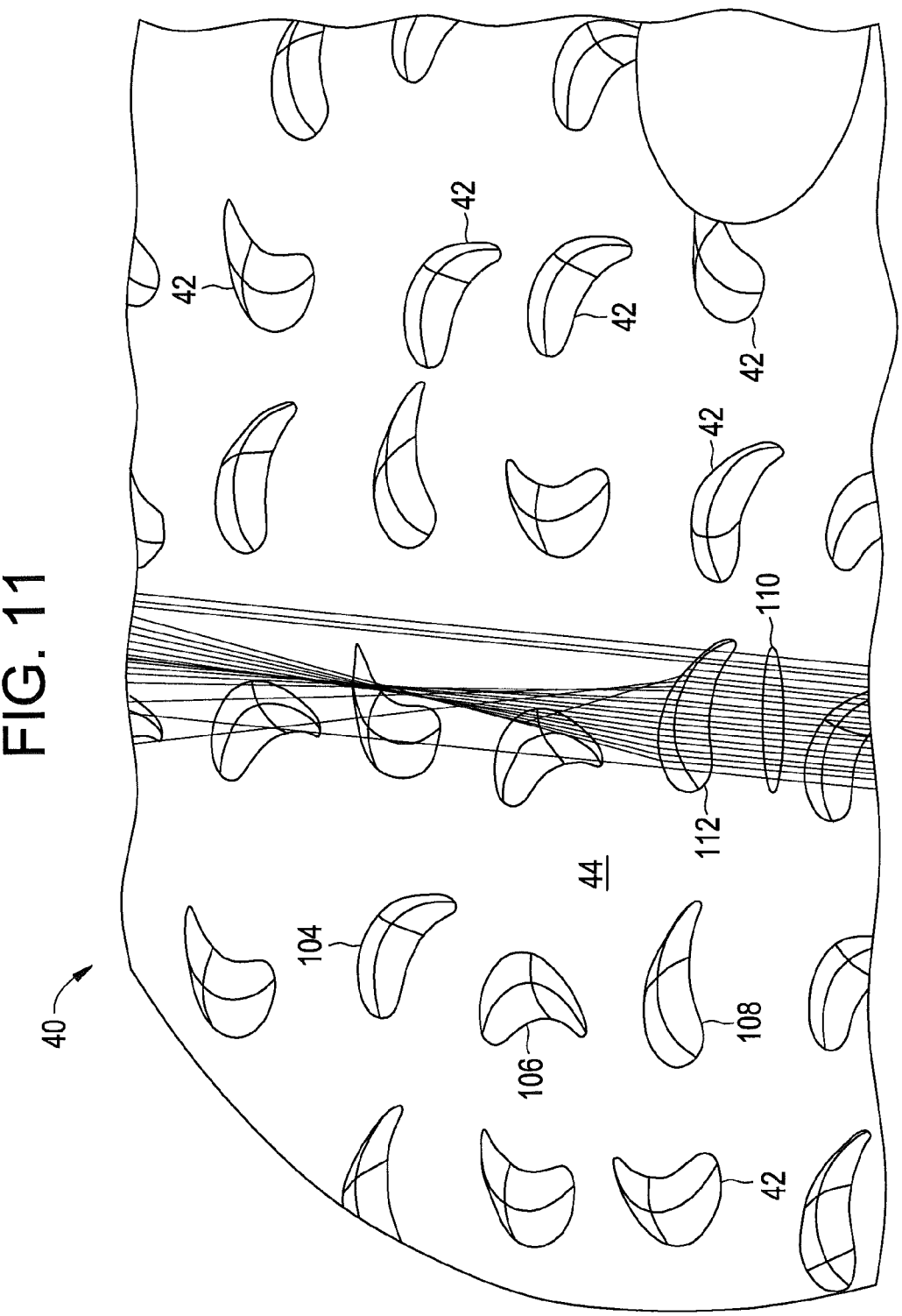
FIG. 11 is a partial perspective view of the luminaire of FIG. 1, illustrating the traversal of an exemplary light ray bundle through a lenslet.

FIG. 11 is a perspective view of an exemplary wisp lenslet array 40, having disposed on at least a portion of the surface 44 thereon a plurality of individual wisp lenslets 42. Exemplary wisp lenslets 104, 106, 108 illustrate three different rotational orientations of lenslets within the plane of the wisp lenslet array 40. Many other rotations are shown in FIG. 11. Persons skilled in the art will realize that individual lenslets within the wisp lenslet array 40 may be oriented at any angle of rotation within the plane of the wisp lenslet array 40. An exemplary light ray bundle 110 traverses through wisp lenslet 112, producing a light ray bundle with a twisting profile generated by the complex upper-surface shape of wisp lenslet 112.

Figure 12:
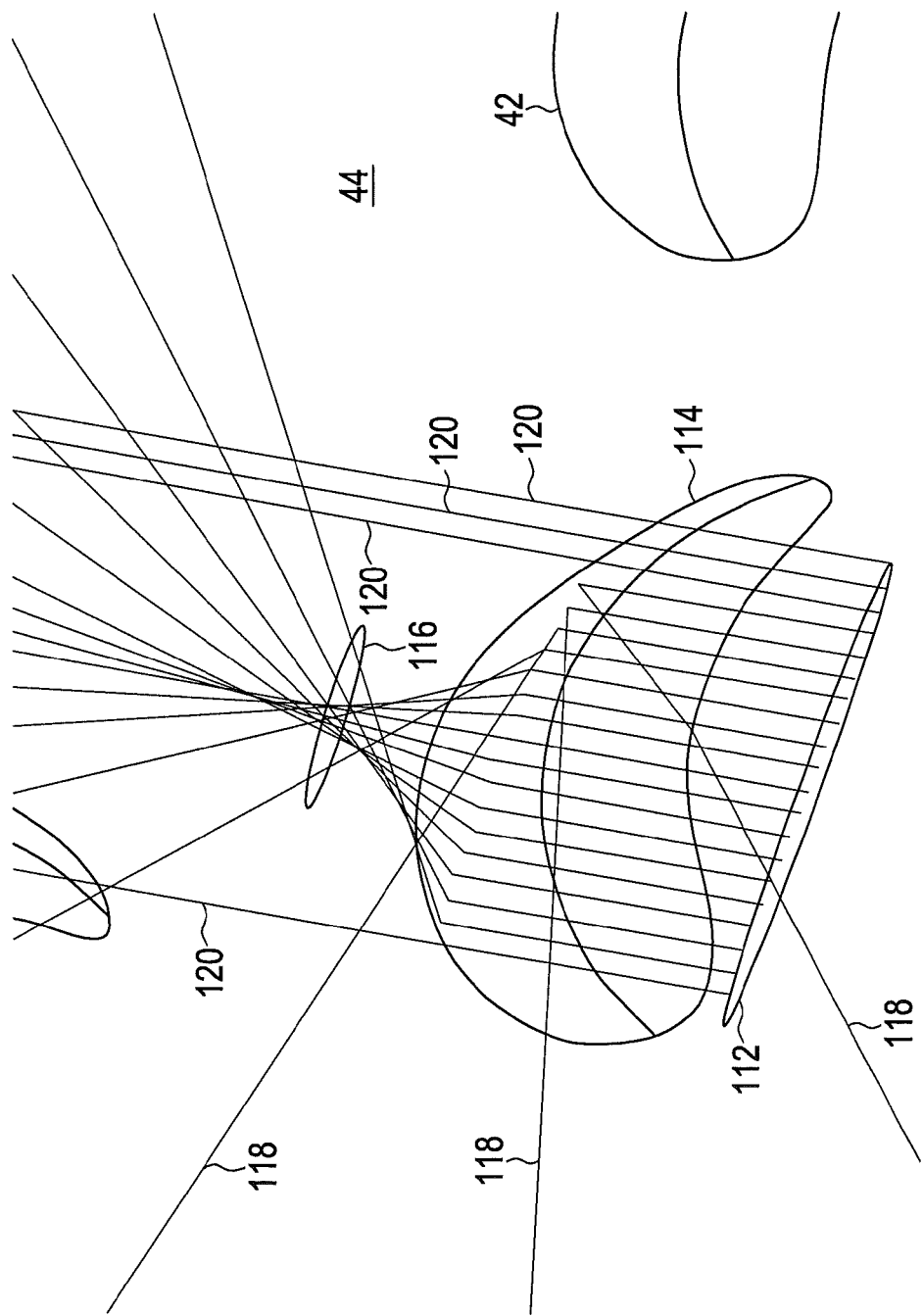
FIG. 12 is a partial perspective view of the lenslet of FIG. 11 illustrating the twist caustic induced on the exemplary light ray bundle by the lenslet.

FIG. 12 is a detailed schematic view of an exemplary twist profile to a bundle of light rays 112, induced by a wisp lenslet 114. This twist profile formed by a bundle of light rays may also be referred to herein as a twist caustic. Individual incident light rays within the light ray bundle 112 enter the wisp lenslet 114 oriented substantially parallel to each other. The twist caustic caused by wisp lenslet 114 causes the exiting bundle of light rays 116 to form a twisted profile relative to the incident light rays 112. It should be appreciated that not all of the individual light rays will be refracted by the wisp lenslet 114 into the twisted profile. Some light rays, such as individual rays 118 for example, will refract outside of the area being illuminated. Other light rays, such as individual rays 120 for example may fall outside the wisp lenslet 114 and pass through the substantially flat surface 44 with a simple flat surface refraction.

Figure 13:
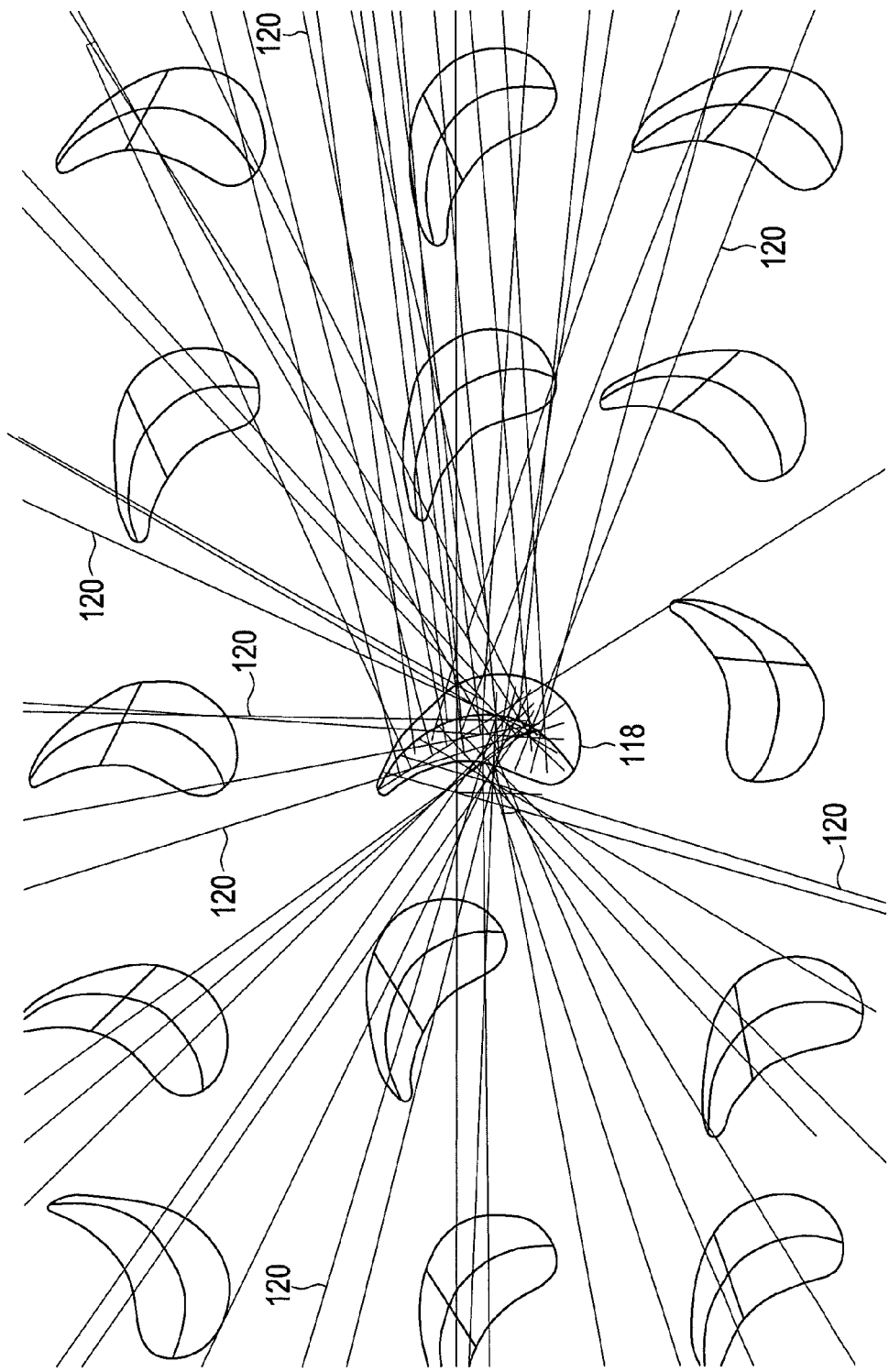
FIG. 13 is a top view of the lenslet of FIG. 12 illustrating the distribution of the exemplary light ray bundle upon exit from the lenslet.

FIG. 13 is a magnified view from above of the light distribution of an exemplary wisp lenslet array 40. An exemplary wisp lenslet 118 is depicted with a portion of the individual light rays emerging from wisp lenslet 118 are marked with reference number 120. It should be understood that the position of light rays 120 are determined assuming that individual light rays enter the bottom side of wisp lenslet 118 substantially parallel to other light rays in the bundle.

Figure 14:
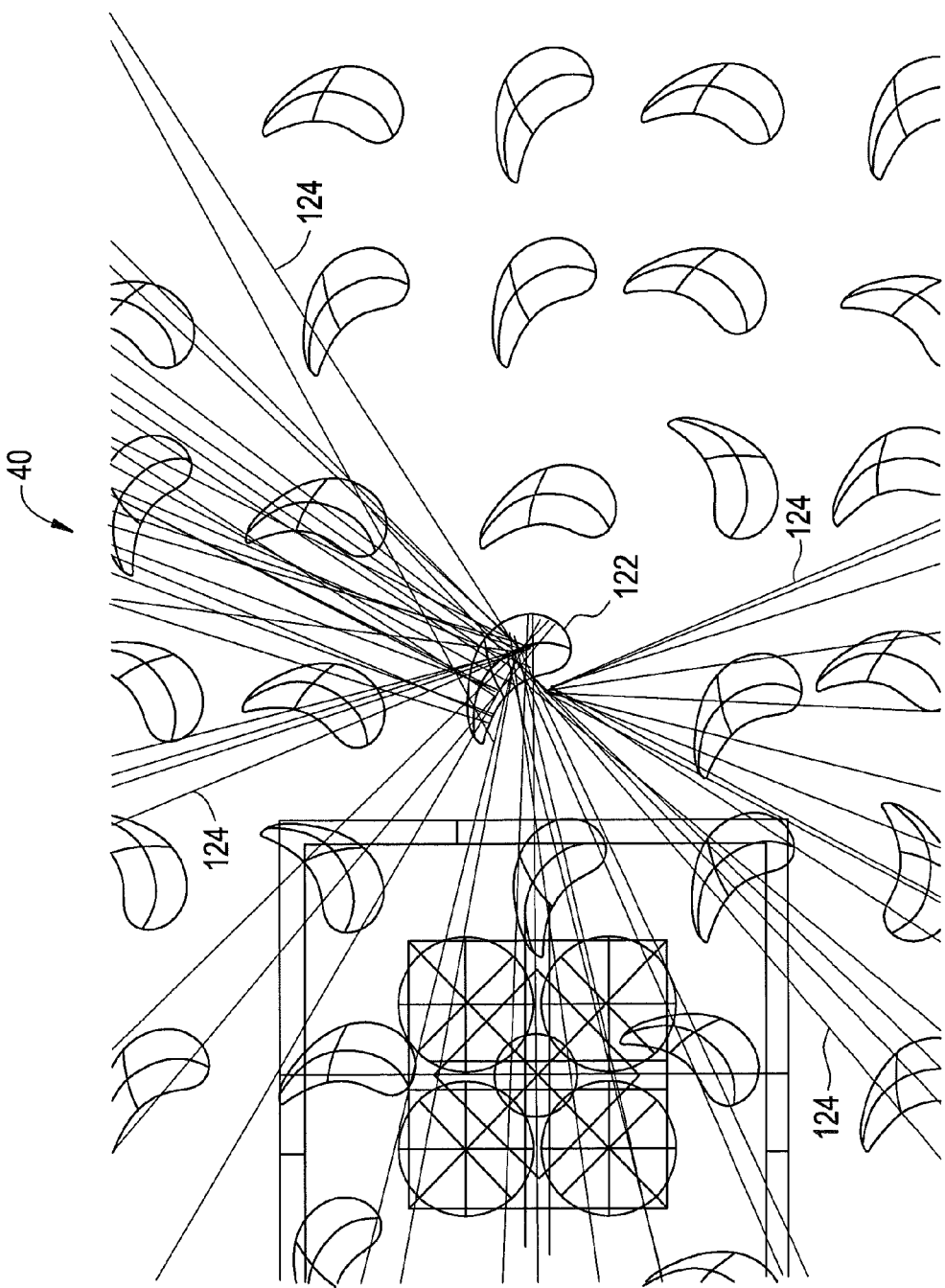
FIG. 14 is another top view of the lenslet of FIG. 12 illustrating the distribution of the exemplary light ray bundle upon exit from the lenslet.

FIG. 14 is an enlarged view looking down onto the wisp lenslet array 40, illustrating the twisting profile of a bundle light rays, similar to the view shown in FIG. 13. One difference from FIG. 13 is that the orientation of wisp lenslet 122 in FIG. 14 is different than the orientation of wisp lenslet 118 in FIG. 13. A portion of the light rays emerging from wisp lenslet 122 is marked with reference number 124. It should be understood that the position of light rays 124 are determined assuming that individual light rays enter the bottom side of wisp lenslet 122 oriented substantially parallel to each other.

Figure 15:
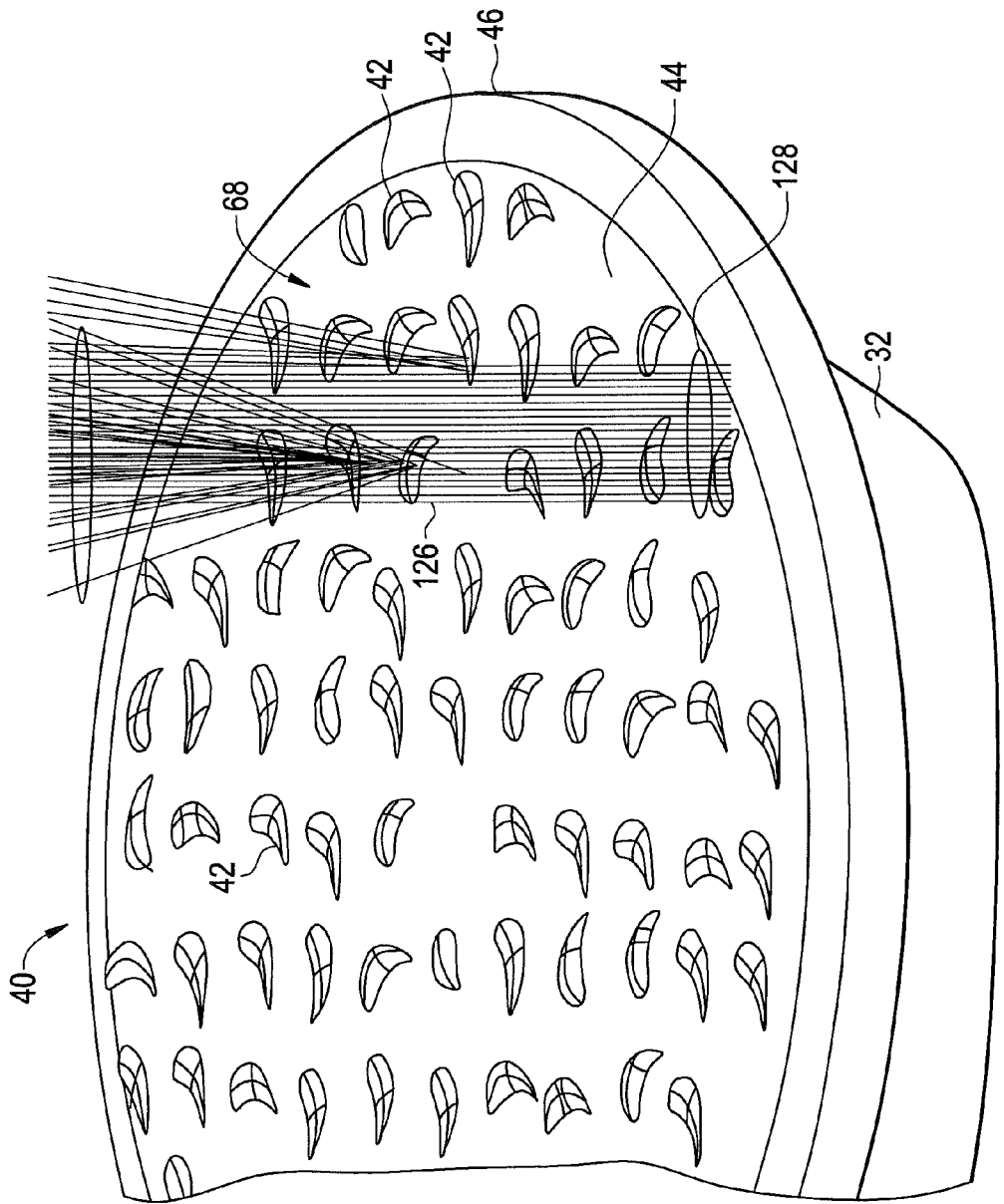
FIG. 15 is a partial perspective view illustration of the luminaire of FIG. 1 illustrating the distribution and twist caustic of another exemplary light ray bundle.

FIG. 15 is a perspective view of the TIR collimator exit aperture 68 in which the face includes the flat surface 44 between the wisp lenslets 42 and depicting the passing of a light ray bundle through a wisp lenslet 126. Below the wisp lenslet 126, the TIR mirror 32 has collimated a bundle of light rays 128. The exit aperture 68 of the TIR collimation device 30 is a generally flat surface 44 on which or in which the wisp lenslet array 40 is located. Portions of the surface 44 not covered by a wisp lenslet 42 have refraction neutrality (i.e., those portions do not refract a light ray that is incident normal to the flat surface 44). Light rays 130 emerge from the wisp lenslet 126 with a twisted profile as discussed above.

Figure 16:
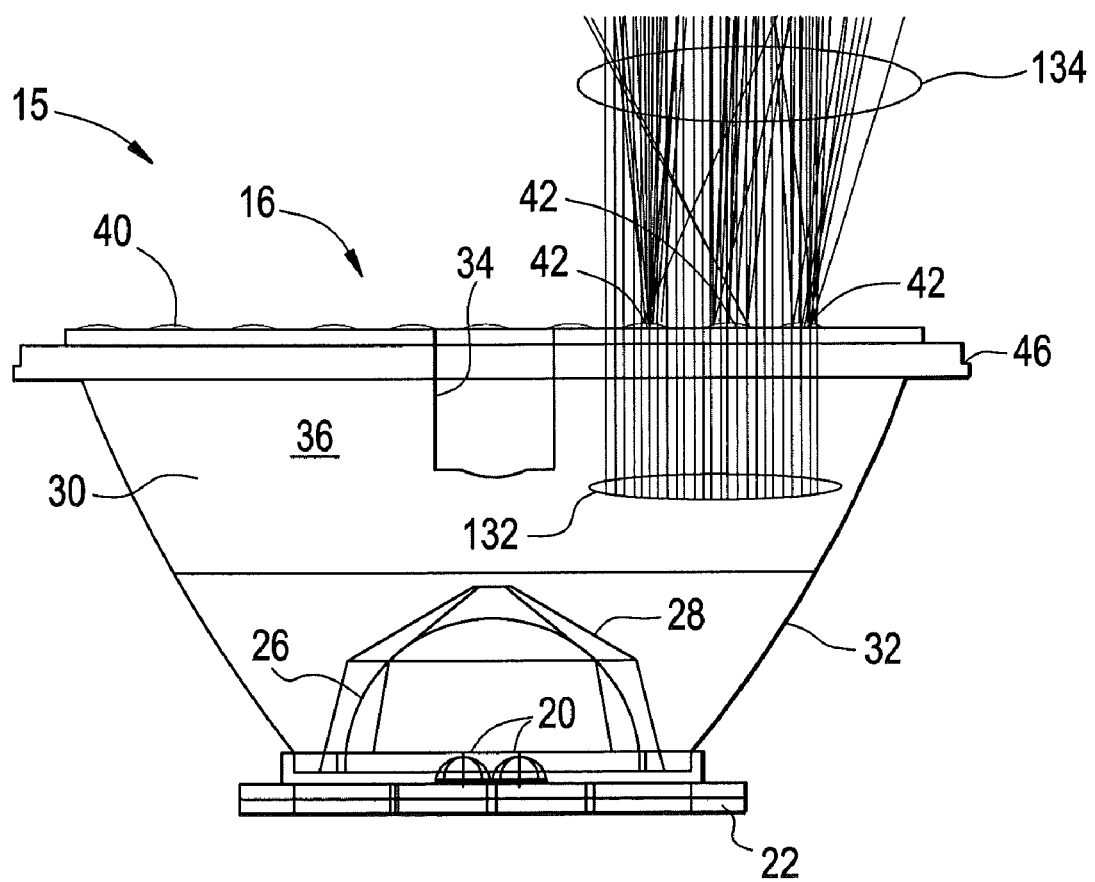
FIG. 16 is a side plan view illustration of the luminaire of FIG. 1 illustrating the path and distribution of another exemplary light ray bundle traversing three wisp lenslets; and, FIG. 17 is an enlarged side plan view illustration of the luminaire of FIG. 16 further illustrating the twist caustic induced by the lenslets.

FIG. 16 is a side view of the TIR collimation optic 16 operating on the light ray bundles emanating from the LED emitter array 20. The configuration is similar to that of FIG. 1, showing PWB 22, light extraction lens 26, interior polynomial surface 28, TIR mirror 32, void 34, and wisp lenslet array 40. For clarity, the collimated ray bundle 132 is illustrated as starting within the interior 36 of light collimation device 30, after reflection from the inner surface of TIR mirror 32. Shown above wisp lenslet array 40 is a light ray bundle 134 generated in a twisted profile by three wisp lenslets 42 within the wisp lenslet array 7. Each of the wisp lenslets 42 generates a separate bundle of light rays having a twisted profile from a portion of light ray bundle 152 that had passed through the wisp lenslet 42.

Figure 17:
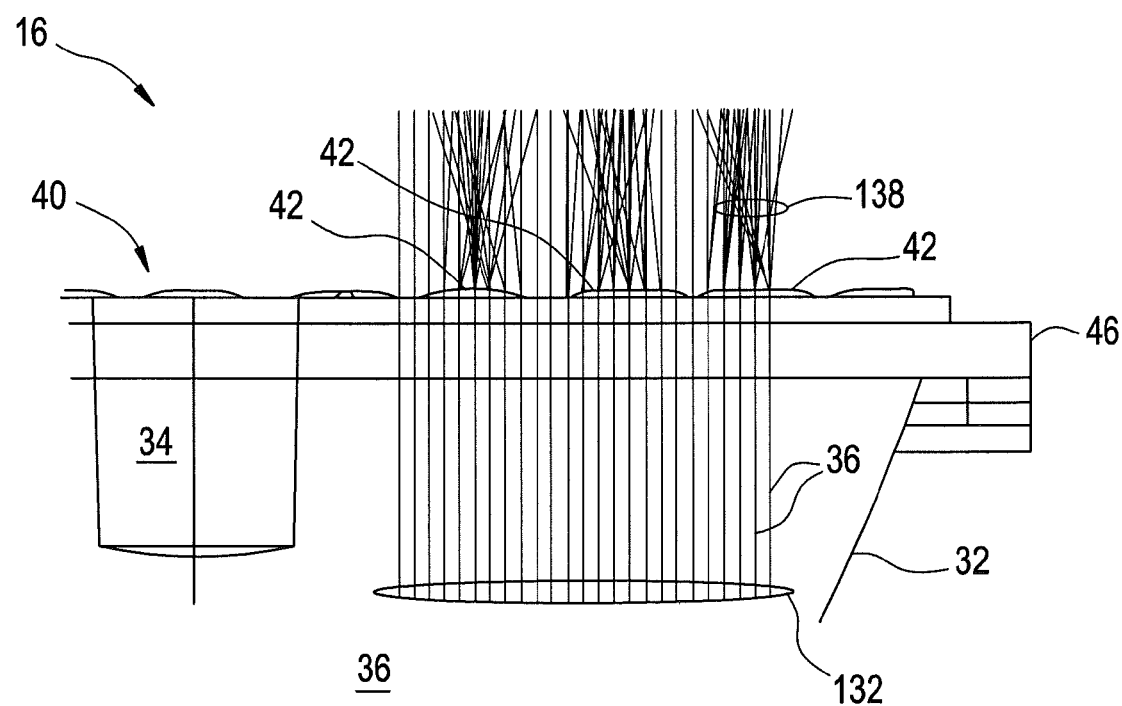

FIG. 17 is an enlarged portion of FIG. 16, depicting the light ray trace behavior of a collimated light ray bundle as it traverses the three wisp lenslets 42. Individual light rays 136 within the collimated ray bundle 132 have a non-zero cross-sectional area. As an individual ray 136 passes through one of the wisp lenslets 42, different portions within the cross-section of the individual light ray 136 are refracted slightly differently by the wisp lenslet 42 depending on the surface shape encountered by that portion of the individual light ray 136. Therefore, individual light rays 136 are drawn as giving rise to several rays within the output ray bundle 138 emerging asymmetrically from the wisp lenslets 42.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A luminaire comprising:
a light source emitting a plurality of light rays;
a collimation device receiving a portion of light from said light source and transmitting said portion of light through an exit aperture, said exit aperture having at least one wisp lenslet formed thereon, said at least one wisp lenslet having a first profile with an associated non-linear center line and a series of second profiles each orthogonal to the non-linear line, wherein said portion of light is refracted on a plurality of angles by said at least one wisp lenslet to form a bundle of light rays having a twisted coil profile.

2. The luminaire of claim 1 wherein said exit aperture includes a plurality of wisp lenslets, each of said plurality of wisp lenslets being oriented on a different angle with respect to each other.

3. The luminaire of claim 1 wherein said at least one wisp lenslet includes a semicircular first end and a substantially pointed second end.

4. The luminaire of claim 3 wherein said first profile extends along a centerline between said first end and said second end.

5. The luminaire of claim 4 wherein said centerline curves from said first end to said second end.

6. A luminaire comprising:
a light emitting diode (LED);
a collimator device arranged to receive light from said LED, said collimator device having an exit aperture opposite said LED;
a lenslet array operably coupled to said exit aperture, said lenslet array having a plurality of substantially tear-drop shaped wisp lenslets thereon, said plurality of wisp lenslets being arranged in a noncontiguous pattern, wherein each of said plurality of wisp lenslets are shaped to diffract a group of parallel light rays received from said exit aperture to be formed into a twisted coil profile.

7. The luminaire of claim 6 wherein each of said plurality of wisp lenslets include a semicircular first end, a substantially pointed second end and a centerline defined between said first end and said second end, wherein said centerline curves between said first end and said second end.

8. The luminaire of claim 7 wherein each of said plurality of wisp lenslets includes a curved profile arranged transverse to said centerline.

9. The luminaire of claim 8 wherein said lenslet array includes a substantially flat surface between said plurality of wisp lenslets.

10. The luminaire of claim 9 wherein each of said plurality of wisp lenslets is arranged on angle relative to a centerline of said surface.

11. The luminaire of claim 10 wherein each of said plurality of wisp lenslets is on a different angle relative to said centerline of said surface.

12. The luminaire of claim 11 wherein said collimator device includes a mirror portion, wherein said mirror portion is arranged to reflect light into said array of lenslets.

13. The luminaire of claim 12 wherein said collimator device includes an interior polynomial surface.

14. A method of lighting an area comprising:
generating a plurality of rays of light;
collimating a first portion of said plurality of rays of light, wherein said first portion includes a second portion and a third portion;
directing said first portion of rays of light into a wisp lenslet array having a first wisp lenslet;
refracting said second portion of rays of light with said first wisp lenslet, wherein said refracted second portion of rays of light forms a twisted coil profile.

15. The method of claim 14 further comprising transmitting said third portion of rays of light through a substantially flat surface adjacent said first lenslet.

16. The method of claim 15 further comprising:
collimating a fourth portion of rays of light from said plurality of rays of light, wherein said fourth portion includes a fifth portion of rays of light and a sixth portion of rays of light;
reflecting said fourth portion of rays of light into said wisp lenslet array.

17. The method of claim 16 further comprising refracting said fifth portion of rays of light with a second wisp lenslet in said wisp lenslet array, wherein said refracted fifth portion of rays of light forms a twisted coil profile.

18. The method of claim 17 further comprising transmitting said sixth portion of rays of light through a substantially flat surface adjacent said second wisp lenslet.

19. The method of claim 18 wherein said first wisp lenslet and said second wisp lenslet are the same lenslet.

* * * * *